United States Patent
Koseoglu

(10) Patent No.: US 10,233,394 B2
(45) Date of Patent: Mar. 19, 2019

(54) INTEGRATED MULTI-STAGE SOLVENT DEASPHALTING AND DELAYED COKING PROCESS TO PRODUCE HIGH QUALITY COKE

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 84 days.

(21) Appl. No.: 15/491,534

(22) Filed: Apr. 19, 2017

(65) Prior Publication Data

US 2017/0306239 A1    Oct. 26, 2017

Related U.S. Application Data

(60) Provisional application No. 62/327,658, filed on Apr. 26, 2016.

(51) Int. Cl.

| | | |
|---|---|---|
| C10B 57/04 | (2006.01) | |
| C01B 31/02 | (2006.01) | |
| C10L 5/04 | (2006.01) | |
| C10G 21/00 | (2006.01) | |
| C10B 57/02 | (2006.01) | |
| C10G 55/04 | (2006.01) | |
| C10B 55/00 | (2006.01) | |
| C10G 21/02 | (2006.01) | |

(52) U.S. Cl.
CPC ............ *C10B 57/045* (2013.01); *C01B 31/02* (2013.01); *C10B 55/00* (2013.01); *C10B 57/02* (2013.01); *C10G 21/003* (2013.01); *C10G 21/02* (2013.01); *C10G 55/04* (2013.01); *C10L 5/04* (2013.01); *C10G 2300/44* (2013.01); *C10L 2290/544* (2013.01)

(58) Field of Classification Search
CPC ................................................... C10B 57/045
See application file for complete search history.

(56) References Cited

U.S. PATENT DOCUMENTS

| | | |
|---|---|---|
| 2,188,051 A | 1/1940 | Lantz |
| 4,006,076 A | 2/1977 | Christensen et al. |
| 4,054,512 A | 10/1977 | Dugan et al. |
| 4,125,459 A | 11/1978 | Garwin |
| 4,324,651 A | 4/1982 | Rollmann et al. |
| 4,338,183 A | 7/1982 | Gatsis |
| 4,405,445 A | 9/1983 | Kovach et al. |
| 4,686,028 A | 8/1987 | Van Driesen et al. |
| 5,192,421 A | 3/1993 | Audeh et al. |
| 5,244,565 A | 9/1993 | Lankton et al. |
| 5,258,117 A | 11/1993 | Kolstad et al. |
| 5,286,371 A | 2/1994 | Goval et al. |
| 5,302,282 A | 4/1994 | Kalnes et al. |
| 5,324,417 A | 7/1994 | Harandi |
| 5,976,361 A | 11/1999 | Hood et al. |
| 6,274,032 B2 | 8/2001 | Hood et al. |
| 6,332,975 B1 | 12/2001 | Abdel-Halim et al. |
| 7,297,250 B2 | 11/2007 | Bronicki |
| 7,566,394 B2 | 7/2009 | Koseoglu |
| 7,622,035 B2 | 11/2009 | Zaki et al. |
| 7,744,743 B2 | 6/2010 | McCoy et al. |
| 7,790,018 B2 | 9/2010 | Khan |
| 7,799,211 B2 | 9/2010 | Koseoglu et al. |
| 7,955,403 B2 | 6/2011 | Ariyapadi et al. |
| 7,955,496 B2 | 6/2011 | Iqbal et al. |
| 7,964,090 B2 | 6/2011 | Iqbal |
| 7,981,277 B2 | 7/2011 | Subramanian et al. |
| 8,382,867 B2 | 2/2013 | Ariyapadi et al. |
| 8,608,942 B2 | 12/2013 | Subramanian et al. |
| 8,696,888 B2 | 4/2014 | Keusenkothen et al. |
| 8,709,233 B2 | 4/2014 | McCoy et al. |
| 8,728,300 B2 | 5/2014 | Iqbal et al. |
| 8,790,508 B2 | 7/2014 | Koseoglu et al. |
| 8,852,426 B2 | 10/2014 | Koseoglu |
| 8,882,991 B2 | 11/2014 | Kuechler et al. |
| 9,023,192 B2 | 5/2015 | Koseoglu |
| 2001/0002654 A1 | 6/2001 | Hood et al. |
| 2002/0112986 A1 | 8/2002 | Li et al. |
| 2003/0129109 A1 | 7/2003 | Bronicki |
| 2006/0032789 A1 | 2/2006 | Bronicki |
| 2006/0254956 A1 | 11/2006 | Khan |
| 2007/0090018 A1 | 4/2007 | Keusenkothen et al. |
| 2008/0099371 A1 | 5/2008 | McCoy et al. |
| 2008/0116109 A1 | 5/2008 | McCoy et al. |
| 2008/0223574 A1 | 9/2008 | Subramanian et al. |
| 2009/0120842 A1 | 5/2009 | Koseoglu et al. |
| 2009/0166266 A1 | 7/2009 | Subramanian et al. |
| 2009/0261017 A1 | 10/2009 | Iqbal et al. |
| 2009/0294328 A1 | 12/2009 | Iqbal |

(Continued)

FOREIGN PATENT DOCUMENTS

| | | |
|---|---|---|
| EP | 0099141 A1 | 1/1984 |
| EP | 2947133 A1 | 11/2015 |
| WO | 2014096592 A1 | 6/2014 |
| WO | 2016015045 A1 | 1/2016 |

OTHER PUBLICATIONS

International Search Report and Written Opinion pertaining to PCT/US2017/028567 dated Jun. 29, 2017.
International Search Report and Written Opinion pertaining to PCT/US2017/028710 dated Jun. 30, 2017.

*Primary Examiner* — Stuart L Hendrickson
(74) *Attorney, Agent, or Firm* — Dinsmore & Shohl LLP

(57) ABSTRACT

Process embodiments for producing high grade coke and fuel grade coke from residual oil comprises: introducing the residual oil and a first paraffinic solvent having a carbon number $C_n$ to a first solvent deasphalting unit to produce a high quality deasphalted oil (HQDAO) fraction and a first asphalt fraction; passing the HQDAO fraction to a delayed coker to produce green coke; passing at least a portion of the first asphalt fraction and a second paraffinic solvent carbon number of $C_{n+1}$ to a second solvent deasphalting unit to produce a low quality deasphalted oil (LQDAO) fraction and a second asphalt fraction; and passing the LQDAO fraction to the delayed coker to produce the fuel grade coke.

15 Claims, 4 Drawing Sheets

(56) References Cited

U.S. PATENT DOCUMENTS

| | | |
|---|---|---|
| 2009/0301931 A1 | 12/2009 | Koseoglu et al. |
| 2010/0011664 A1 | 1/2010 | Ariyapadi et al. |
| 2010/0132257 A1 | 6/2010 | Agrawal et al. |
| 2010/0147647 A1 | 6/2010 | Koseoglu et al. |
| 2011/0042269 A1 | 2/2011 | Kuechler et al. |
| 2011/0094937 A1 | 4/2011 | Subramanian et al. |
| 2011/0215030 A1 | 9/2011 | Corscadden |
| 2011/0226666 A1 | 9/2011 | Koseoglu et al. |
| 2012/0074040 A1 | 3/2012 | Koseoglu et al. |
| 2012/0091032 A1 | 4/2012 | Iqbal et al. |
| 2012/0101323 A1 | 4/2012 | Ariyapadi et al. |
| 2012/0298552 A1 | 11/2012 | Koseoglu |
| 2013/0026064 A1 | 1/2013 | Koseoglu |
| 2013/0026067 A1 | 1/2013 | Koseoglu |
| 2013/0026069 A1 | 1/2013 | Koseoglu |
| 2013/0026074 A1 | 1/2013 | Koseoglu et al. |
| 2013/0026075 A1 | 1/2013 | Koseoglu et al. |
| 2013/0047509 A1 | 2/2013 | Ariyapadi et al. |
| 2013/0055637 A1 | 3/2013 | Ariyapadi et al. |
| 2013/0062255 A1 | 3/2013 | Koseoglu |
| 2013/0062257 A1 | 3/2013 | Koseoglu |
| 2013/0081325 A1 | 4/2013 | Corscadden et al. |
| 2013/0081977 A1 | 4/2013 | Woo et al. |
| 2013/0126395 A1 | 5/2013 | Koseoglu et al. |
| 2013/0161236 A1 | 6/2013 | Strauss et al. |
| 2013/0161237 A1 | 6/2013 | Woo et al. |
| 2013/0180888 A1 | 7/2013 | Corscadden et al. |
| 2013/0197284 A1 | 8/2013 | Bourane et al. |
| 2013/0197289 A1 | 8/2013 | Bourane et al. |
| 2013/0213857 A1 | 8/2013 | Bisht et al. |
| 2013/0220884 A1 | 8/2013 | Bourane et al. |
| 2013/0228496 A1 | 9/2013 | Bourane et al. |
| 2013/0233768 A1 | 9/2013 | Bourane et al. |
| 2013/0240407 A1 | 9/2013 | Gillis |
| 2013/0292299 A1 | 11/2013 | Koseoglu et al. |
| 2013/0315793 A1 | 11/2013 | Koseoglu et al. |
| 2013/0319910 A1 | 12/2013 | Koseoglu et al. |
| 2013/0334103 A1 | 12/2013 | Bourane et al. |
| 2014/0117287 A1 | 5/2014 | Ariyapadi et al. |
| 2014/0275672 A1 | 9/2014 | Krishnamurthy et al. |
| 2014/0305840 A1 | 10/2014 | Koseoglu et al. |

INTEGRATED MULTI-STAGE SOLVENT DEASPHALTING AND DELAYED COKING PROCESS TO PRODUCE HIGH QUALITY COKE

CROSS-REFERENCE TO RELATED APPLICATIONS

This application claims the benefit of U.S. Provisional Application Ser. No. 62/327,658 filed Apr. 26, 2016, incorporated herein by reference.

TECHNICAL FIELD

Embodiments of the present disclosure generally relate to processes for producing high quality coke, and more specifically relate to processes which utilize multi-stage solvent deasphalting and delayed coking used to produce high quality coke.

BACKGROUND

Coke, specifically, high quality coke is utilized in various industrial applications. For example, high quality coke such as anode grade coke may be used in the aluminum industry and needle grade coke may be used in the steel industry. Coking units are conventional oil refinery processing units that convert low value residual oil, from the vacuum distillation column or the atmospheric distillation column into low molecular weight hydrocarbon gases, naphtha, light and heavy gas oils, and petroleum coke. The most commonly used coking unit is a delayed coker. In a basic delayed coking process, fresh feedstock is introduced into the lower part of a fractionator. The fractionator bottoms, which include heavy recycle material and fresh feedstock, are passed to a furnace and heated to a coking temperature. The hot feed then goes to a coke drum maintained at coking conditions where the feed is cracked to form light products while heavy free radical molecules form heavier polynuclear aromatic compounds, which are referred to as "coke." With a short residence time in the furnace, coking of the feed is thereby "delayed" until it is discharged into a coking drum. The volatile components are recovered as coker vapor and returned to the fractionator, and coke is deposited on the interior of the drum. When the coke drum is full of coke, the feed is switched to another drum and the full drum is cooled and emptied by conventional methods, such as by hydraulic means or by mechanical means.

That being said, residual oil is known to have a significant amount of asphalt and other impurities which decreases the yield of high quality coke. Thus, conventional approaches use upstream high severity hydrotreating and hydrocracking to purify the residual oil, such that the purified residual oil may be converted into high quality coke precursor, also called green coke, in the delayed coker. The green coke produced in the delayed coker may then be calcined to produce anode coke or needle coke. While the hydrotreating upstream of the delayed coker yields green coke, it is very expensive due to its high pressure requirement.

SUMMARY

Accordingly, ongoing needs exist for improved methods and systems for producing high quality coke.

Embodiments of the present disclosure are directed to producing high quality coke using multi-stage solvent deasphalting upstream of a delayed coker. In addition to producing high quality coke, replacing the hydrotreating and hydrocracking processes with the multi-stage solvent deasphalting process significantly reduces the costs for reducing high quality coke. As an alternative to replacing the hydrotreating and hydrocracking processes, using the multi-stage solvent deasphalting process may allow the use of a lower severity hydrotreating unit, which also lowers costs.

In accordance with one or more embodiments, the multi-stage solvent deasphalting may use at least two different solvent deasphalting vessels with at least two different solvents of varying carbon number to separate the residual oils into two deasphalted oil fractions with different quality, a high quality deasphalted oil, which is low in metal and sulfur content, and a lower quality deasphalted oil. The high quality deasphalted oil may be used as a feedstock in a delayed coking process to produce high quality coke, while the lower quality deasphalted oil is generally used to produce fuel grade coke.

In one embodiment, a process for producing high grade coke and fuel grade coke from residual oil is provided. The process comprises: passing the residual oil and a first paraffinic solvent having a carbon number $C_n$ to a first solvent deasphalting unit to produce a high quality deasphalted oil (HQDAO) fraction and a first asphalt fraction; passing the HQDAO fraction to a delayed coker to produce green coke; passing at least a portion of the first asphalt fraction and a second paraffinic solvent carbon number of $C_{n+1}$ to a second solvent deasphalting unit to produce a low quality deasphalted oil (LQDAO) fraction and a second asphalt fraction; and passing the LQDAO fraction to the delayed coker to produce the fuel grade coke.

In accordance with another embodiment, a system for producing green coke and fuel grade coke from residual oil is provided. The system comprises first solvent deasphalting unit configured to produce a high quality deasphalted oil (HQDAO) fraction and a first asphalt fraction from the residual oil and a first paraffinic solvent having a carbon number $C_n$; a second solvent deasphalting unit downstream of the first solvent deasphalting unit, the second solvent deasphalting unit being configured to produce a low quality deasphalted oil (LQDAO) fraction and a second asphalt fraction from the first asphalt fraction and a second paraffinic solvent having carbon number of $C_{n+1}$; and a delayed coker in fluid communication with the first solvent deasphalting unit and the second solvent deasphalting unit, wherein the delayed coker is configured to produce green coke from the HQDAO fraction and is configured to produce fuel coke from the LQDAO fraction.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

Figure 1:
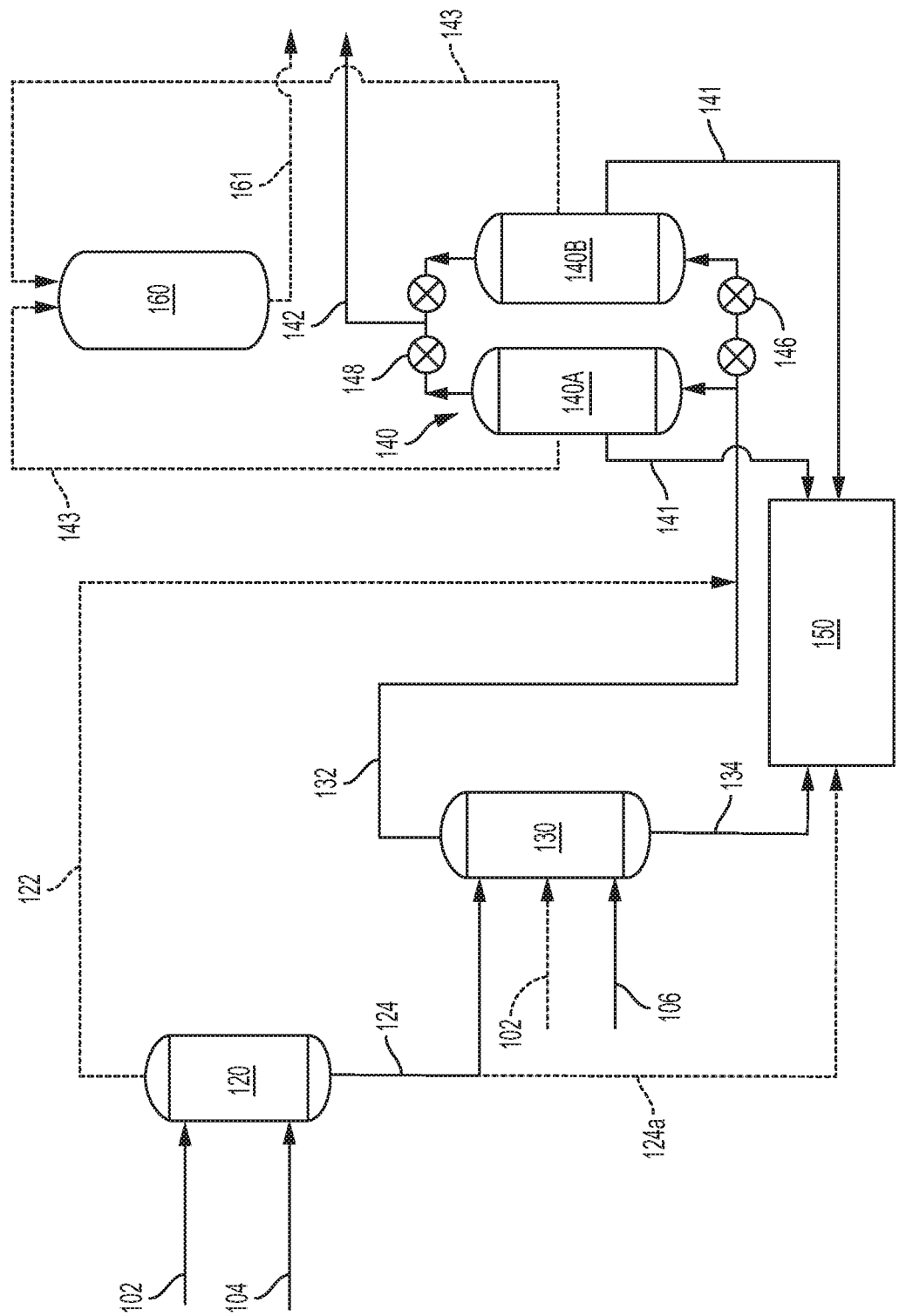
FIG. 1 is a schematic depiction of the multi-stage solvent deasphalting unit upstream of a delayed coker in accordance with one or more embodiments of the present disclosure.

The embodiments set forth in the drawings are illustrative in nature and not intended to be limiting to the claims. Moreover, individual features of the drawings will be more fully apparent and understood in view of the detailed description.

DETAILED DESCRIPTION

Embodiments of the present disclosure are directed to systems and processes for producing high grade coke and fuel grade coke from residual oil.

As used in the application, "residual oil" refers to the product of vacuum distillation or atmospheric distillation obtained in oil refineries. Atmospheric residue is defined as hydrocarbons boiling at a temperature of at least 350° C. and vacuum residue is defined as hydrocarbons boiling at a temperature of at least 450° C.

As used in the application, "anode coke", "fuel coke", and "needle coke" are defined by the ranges and properties provided in the following Table 1. As will be described further in the following examples, fuel grade coke, which generally has greater than 3.5 weight (wt) % of sulfur, and anode coke, which generally has less than 3.5 wt % sulfur, are often distinguished based on the sulfur content in the respective cokes.

TABLE 1

| Property | Units | Fuel Coke | Calcined High Quality Anode Coke | Calcined High Quality Needle Coke |
|---|---|---|---|---|
| Bulk Density | Kilograms per cubic meter (Kg/m$^3$) | 880 | 720-800 | 670-720 |
| Sulfur | wt % | 3.5-7.5 | 1.0-3.5 | 0.2-0.5 |
| Nitrogen | Parts per million by weight (Ppmw) | 6,000 | — | 50 |
| Nickel | ppmw | 500 | 200 | 7 max |
| Vanadium | ppmw | 150 | 350 | — |
| Volatile Combustible Material | wt % | 12 | 0.5 | 0.5 |
| Ash Content | wt % | 0.35 | 0.40 | 0.1 |
| Moisture Content | | 8-12 | 0.3 | 0.1 |
| Hardgrove Grindability Index (HGI) | wt % | 35-70 | 60-100 | — |
| Coefficient of thermal expansion, E + 7 | ° C. | — | — | 1-5 |

As shown in FIG. 1 and discussed in subsequent sections, it is possible that the HQDAO fraction 122 is fed to the delayed coker separately from the LQDAO fraction 132. This alternating processing arrangement, which uses a dotted line for HQDAO fraction 122 to delineate the coke processing of the HQDAO fraction 122 and the LQDAO fraction 132, is further illustrated in the Examples. In one embodiment, the HQDAO fraction 122 is fed to the delayed coker followed by the LQDAO fraction 132; however, the reverse order is possible. In another embodiment, it is contemplated that the HQDAO fraction 122 and the LQDAO fraction 132 may be combined into one feed for the delayed coker. While not shown, it is contemplated to have separate delayed cokers for processing the LQDAO fraction 132 and the HQDAO fraction 122.

Referring to the embodiment of FIGS. 1-4, residual oil 102 and a first paraffinic solvent 104 having a carbon number $C_n$ are passed to a first solvent deasphalting unit 120 to produce a high quality deasphalted oil (HQDAO) fraction 122 and a first asphalt fraction 124. Here, n is an integer, for example, and integer from 3 to 8. The HQDAO fraction 122 may then be passed to a delayed coker 140 to produce green coke 143. As used in the application, "HQDAO fraction" refers to a deasphalted oil stream having lesser amounts sulfur and other metals, thereby making it suitable for the production of green coke, which may be calcined into high grade coke.

Referring again to FIGS. 1-4, at least a portion of the first asphalt fraction 124 may be co-fed to a second solvent deasphalting unit 130 with a second paraffinic solvent 106 having a carbon number of $C_{n+1}$ to produce a low quality deasphalted oil (LQDAO) fraction 132 and a second asphalt fraction 134. The LQDAO fraction 132 may then be fed to the delayed coker to produce fuel grade coke 141. As used in the application, "LQDAO fraction" refers to a deasphalted oil stream having greater amounts of sulfur and other metals than the HQDAO fraction, thereby limiting its suitability in most embodiments solely to the production of lower quality fuel coke.

The first paraffinic solvent and the second paraffinic solvent are used to separate asphalt from residual oil by precipitating the asphalts and recovering the deasphalted oil. The first paraffinic solvent 104 has a lower carbon number than the second paraffinic solvent 106, so it produces a lesser yield of deasphalted oil. However, the HQDAO fraction 122, which is a lesser yield, generally has lesser amounts of sulfur and other metals, such as nickel. Conversely, the second paraffinic solvent 106 has a higher carbon number than the first paraffinic solvent 104, which produces higher yields of deasphalted oil; however, this yield is lower quality and generally has greater amounts of sulfur and other metals. Said another way, the lower carbon number solvent (the first paraffinic solvent 104) rejects more of the residual oil feed as asphalt fraction as compared to the higher carbon number solvent (the second paraffinic solvent 106).

Various solvents compositions are contemplated for the first paraffinic solvent 104 and the second paraffinic solvent 106. For example, any suitable $C_3$-$C_8$ carbon solvent may be used for the first paraffinic solvent 104 and the second paraffinic solvent 106, with the condition that the second paraffinic solvent 106 have at least one more carbon than the first paraffinic solvent 104. While the following examples disclose single solvents for the first paraffinic solvent 104 and the second paraffinic solvent 106, solvent mixtures are contemplated for the first paraffinic solvent 104, the second paraffinic solvent 106, or combinations thereof. In one or more embodiments, the first paraffinic solvent comprises $C_3$-$C_7$ paraffins, and the second paraffinic solvent comprise $C_4$-$C_8$ paraffins. In a specific embodiment, the first paraffinic solvent 104 comprises propane and the second paraffinic solvent 106 comprises pentane. Optionally, a small percentage of aromatics, for example 3-5% or 3-10% by volume, may be added to the first paraffinic solvent 104, the second paraffinic solvent 106, or both to recover more oil in the process. Aromatics dissolve more oil and asphalt and as a result more oil will be recovered in the solvent deasphalting step at a cost of deasphalted oil quality.

Referring again to FIGS. 1-4, various processing parameters are considered suitable for the operation of the first solvent deasphalting unit 120. For example, the first solvent deasphalting unit 120 may operate at a temperature and a pressure less than the solvent critical pressure and temperature of the solvent. Additionally, the yield of HQDAO fraction 122 and first asphalt fraction 124 may be adjusted by varying the ratio of the first paraffinic solvent 104 to the residual oil 102. In one or more embodiments, the ratio by weight of the first paraffinic solvent 104 to the residual oil 102 is from 2 to 20, or from 5 to 10, or from 6 to 8.

In another embodiment, the first solvent deasphalting unit 120 yields more first asphalt fraction 124 than HQDAO fraction 122. In further embodiments, the ratio by weight of the first asphalt fraction 124 to the HQDAO fraction 122 is at least 1 to 5, or from 1.1 to 2, or from 1.2 to 1.5. Moreover, other ratios are contemplated as suitable for additional embodiments of the present disclosure. Without being bound by theory and as stated previously, the HQDAO fraction 122 is a higher quality stream with less impurities, because the first solvent deasphalting unit 120 is more selective and rejects more of the residual oil 102 into the first asphalt fraction 124.

Referring yet again to FIGS. 1-4, a portion 124a of the first asphalt fraction 124 may be fed to asphalt and coke utilization units 150 instead of the second solvent deasphalting unit 130. As used in the application, "asphalt and coke utilization units" encompasses units or components such as gasification reactor, asphalt pools, pyrolysis reactors, and combinations thereof. Additionally, "asphalt and coke utilization units" can also encompass a storage tank or container which stores the produced fuel grade coke 141.

Referring yet again to FIGS. 1-4, the second solvent deasphalting unit 130, like the first solvent deasphalting unit 120, may also have various operating parameters. The second solvent deasphalting unit 130 may have similar pressure and temperature ranges as the previously disclosed pressure and temperature ranges of the first solvent deasphalting unit 120. Additionally, it is contemplated that the operating pressure and temperature of the second solvent deasphalting unit 130 may differ from the operating pressure and temperature of the first solvent deasphalting unit 120. Moreover, the ratio by weight of the second paraffinic solvent 106 to the first asphalt fraction is from 2 to 20, or from 5 to 10, or from 6 to 8. As shown in FIGS. 1-4, some residual oil 102 may optionally be fed to the second solvent deasphalting unit 130 in addition to the first asphalt fraction 124.

In another embodiment, the second solvent deasphalting unit converts the first asphalt fraction 124 to yield the LQDAO fraction 132 and the second asphalt fraction 134, which is lesser by weight than the LQDAO fraction 132. In one or more embodiments, the ratio by weight of the LQDAO fraction 132 to the second asphalt fraction 134 is from 1.5 to 30, or from 2 to 25, or from 2.5 to 20. Moreover, other ratios are contemplated as suitable for additional embodiments of the present disclosure. Without being bound by theory and as stated previously, the LQDAO fraction 132 is a lesser quality stream with more impurities, because the second solvent deasphalting unit 130 is less selective and rejects less of the first asphalt fraction 124. Referring again to FIGS. 1-4, the second asphalt fraction 134 may undergo further asphalt utilization and conversion steps 150 as described previously.

As shown in FIGS. 1-4, the delayed coker 140 may include at least two parallel drums 140A, 140B, which are operated in a swing mode. When one coke drum is full of coke, the feed is switched to a fresh empty drum, and the full drum is cooled. As shown, inlet valves 146 and outlet valves 148 may control flow in and out of the delayed coker 140. The coke remaining in the drums is typically cooled with water and then removed from the coke drum by conventional methods, for example, using hydraulic or mechanical techniques, or both, to dislodge the solid coke from the drum walls for recovery.

As shown in FIG. 1, it is possible that the HQDAO fraction 122 is fed to the delayed coker separately from the LQDAO fraction 132. This alternating processing arrangement, which uses a dotted line for HQDAO fraction 122 to delineate the coke processing of the HQDAO fraction and the LQDAO fraction, is further illustrated in the Examples. In one embodiment, the HQDAO fraction 122 is fed to the delayed coker followed by the LQDAO fraction 132; however, the reverse order is possible. In another embodiment, it is contemplated that the HQDAO fraction 122 and the LQDAO fraction 132 may be combined into one feed for the delayed coker. While not shown, it is contemplated to have separate delayed cokers for processing the LQDAO fraction 132 and the HQDAO fraction 122.

Figure 2:
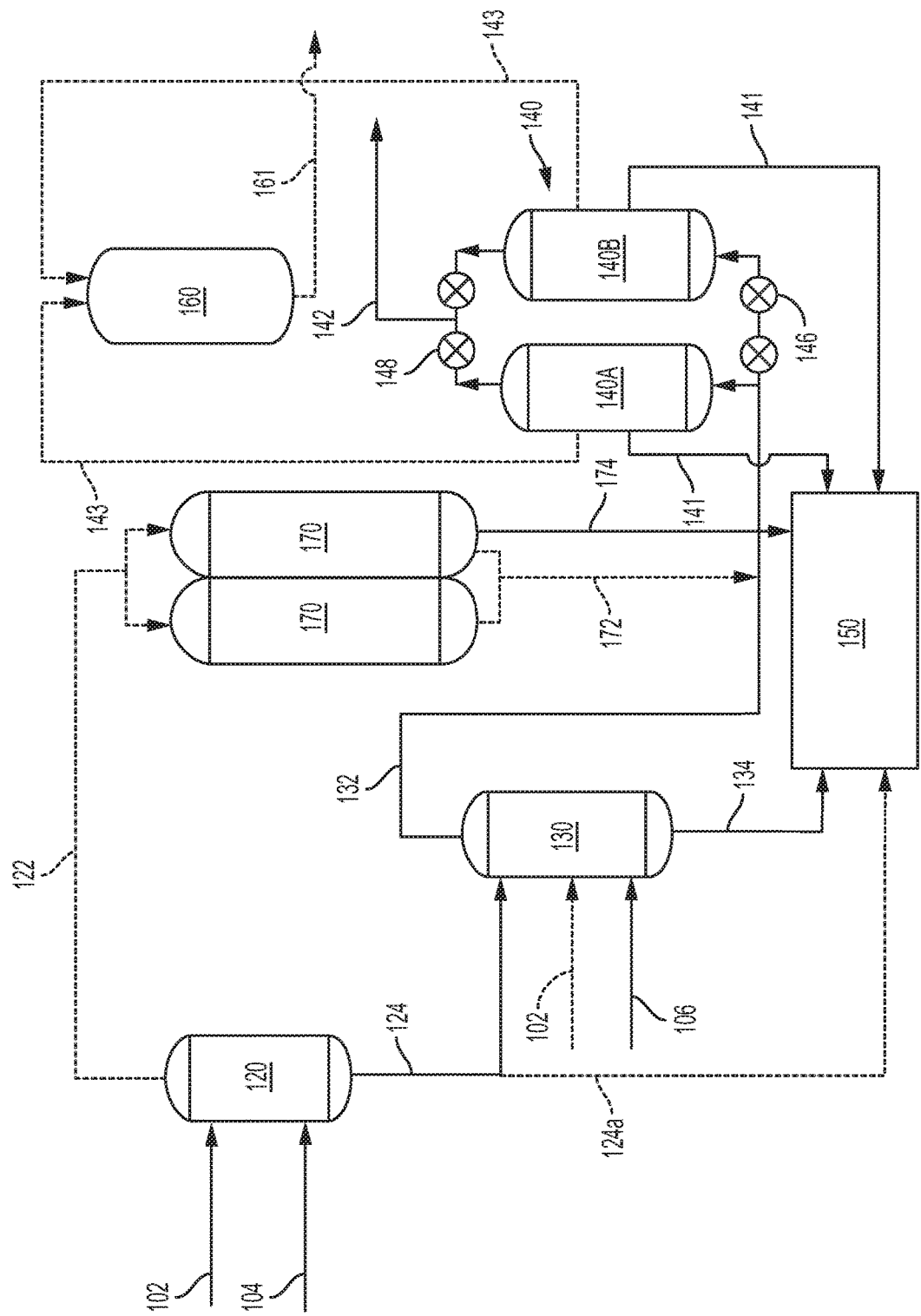
FIG. 2 is a schematic depiction of another embodiment where adsorbent bed columns are used to treat the HQDAO fraction upstream of the delayed coker.
Figure 3:
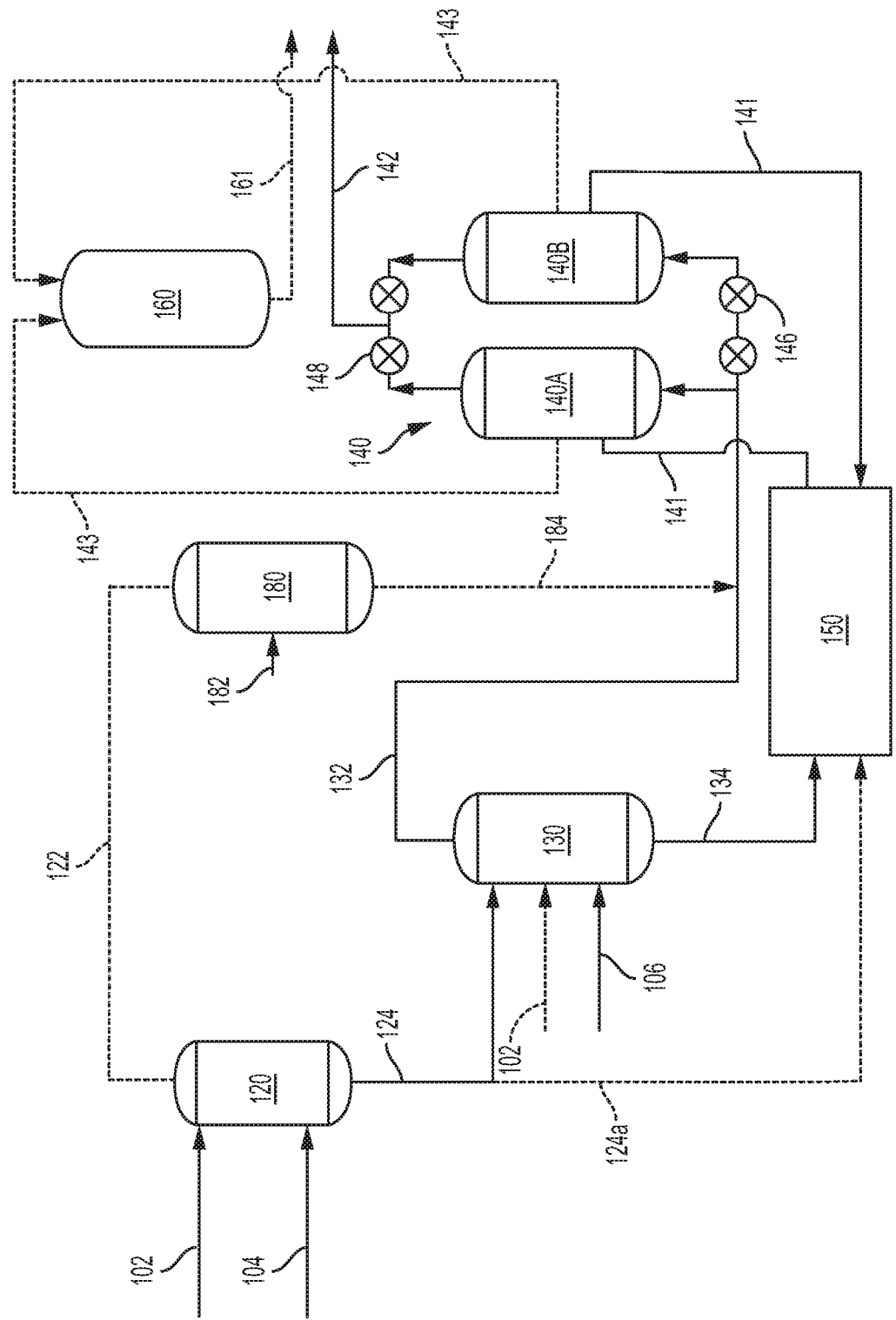
FIG. 3 is a schematic depiction of an embodiment where a hydrotreating reactor is used to treat the HQDAO fraction upstream of the delayed coker.
Figure 4:
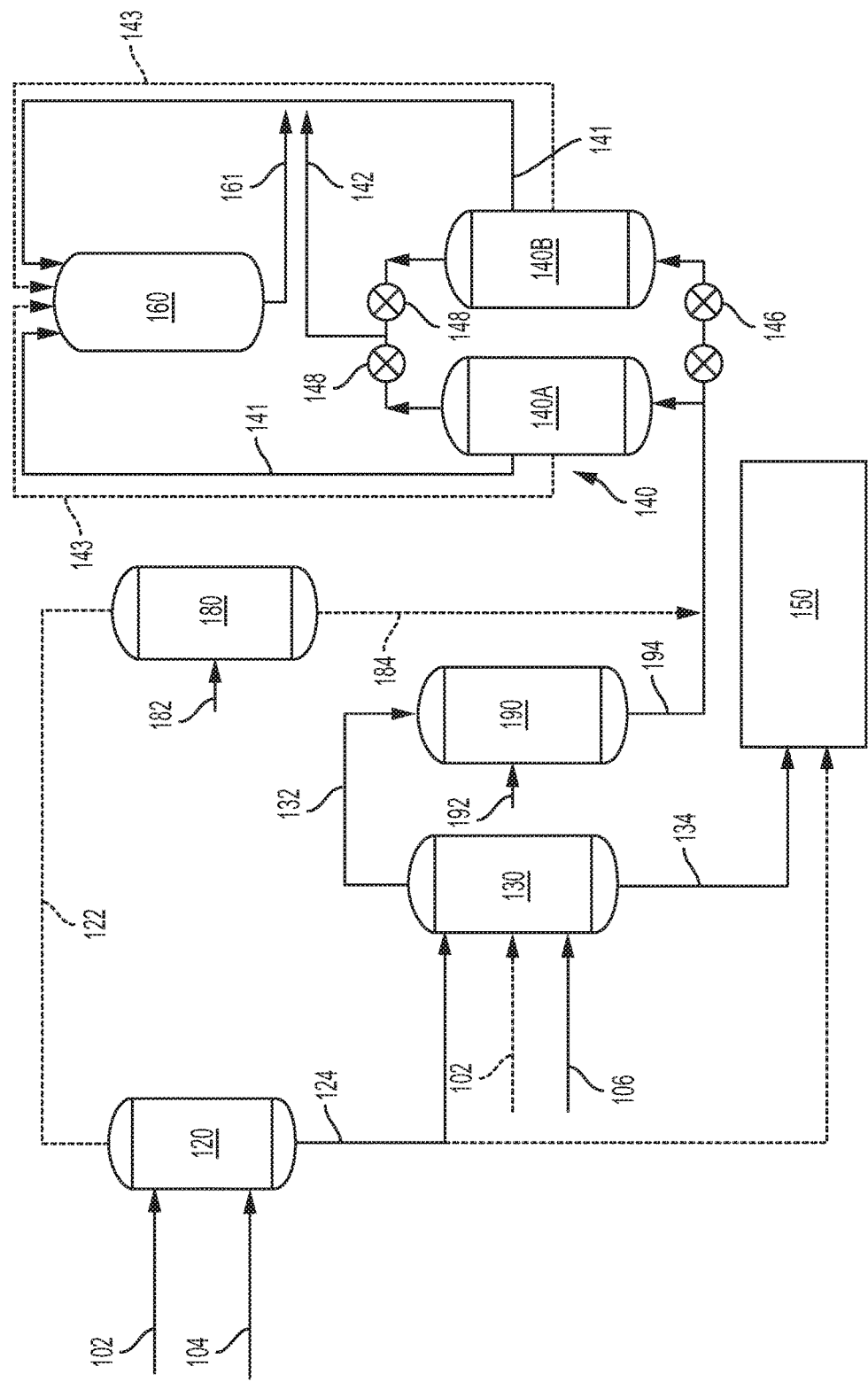
FIG. 4 is a schematic depiction of an embodiment where dual hydrotreating reactors are used to treat both the HQDAO fraction and the LQDAO fraction upstream of the delayed coker.

As shown in the embodiments of FIGS. 1-3, the delayed coker drums 140A, 140B may convert at least a portion of the HQDAO fraction 132 to green coke 143. The green coke 143 may be delivered to a calciner unit 160 to produce high grade coke 161, such as anode coke, needle coke, or combinations thereof. As will be discussed in subsequent sections and as depicted in the embodiment of FIG. 4, the LQDAO fraction 132 may, in some instances, have reduced levels of sulfur and other impurities, which enable it to be converted to high grade coke 161. However, in most embodiments, for example, the embodiments of FIGS. 1-3, the LQDAO fraction 132 will be converted into fuel grade coke 141, which is typically not calcined. Various operating parameters are considered suitable for the delayed coker 140. For example, the temperature may range from 440 to 530° C., and the pressure may range from 1 to 5 kg/cm$^2$.

In addition to coke, the delayed coker drums 140A, 140B also discharge distillates and gases 142, which are produced during the delayed coking process. The distillate may include naphtha, light gas oil, and heavy gas oil. The light gases may include $C_1$-$C_4$ hydrocarbons, hydrogen sulfide, ammonia, and $H_2$. While not shown, the light gases may be separated from the distillates in a flash unit downstream of the delayed coker, and the distillate components, for example, naphtha, light gas oil, and heavy gas oil, may be individually separated in a fractionator downstream of the flash unit.

Referring now to the embodiments of FIGS. 2-4, the HQDAO fraction 122 may be further treated or purified upstream of the delayed coker 140. Various purification units are contemplated. Referring to FIG. 2, the HQDAO fraction 122 may be treated in one or more adsorption columns 170. The adsorption columns 170 may be utilized to further desulfurize and demetallize the HQDAO fraction 122 prior to coking in the delayed coker drums 140A, 140B. The adsorption columns 170 may include various adsorbent materials. These materials may be in packaged or slurry form and may include, but are not limited to, attapulgus clay, zeolites, alumina, silica gel, silica-titania, silica-alumina, titania, spent or regenerated catalysts from other refinery operations, as well as activated carbon. In further embodiments, the adsorption columns 170 may include one or more packed bed columns. Various operating parameters are suitable for the adsorption columns 170. For example, the pressure may be from 1 to 10 kg/cm$^2$, or from 1 to 5 kg/cm$^2$. In one or more embodiments, the temperature may be from 70 to 110° C., or from 70 to 90° C. Moreover, the liquid hourly space velocity (LHSV) within the adsorption columns 170 may vary from 0.5 to 5 hours$^{-1}$ (h$^{-1}$), or from 1 to 3 h$^{-1}$.

Referring again to FIG. 2, the adsorption columns 170 may produce a purified HQDAO fraction 172, which may then be fed to the delayed coker 140. Used adsorbent materials and adsorbed asphalt 174 typically undergo further asphalt utilization and conversion 150. This may include passing the used adsorbent materials and adsorbed asphalt 174 to an asphalt pool. Moreover, while FIG. 2 depicts the treatment of the HQDAO fraction 122, it is contemplated that the LQDAO fraction 132 may also be treated in adsorption columns 170.

Referring to the embodiment of FIG. 3, a first hydrotreater 180 may remove sulfur, metals, and nitrogen from the HQDAO fraction 122 upstream of the delayed coker 140. The first hydrotreater 180 produces a hydrotreated HQDAO stream 184, which may then be fed to the delayed coker 140. Various hydrotreating processes and components are considered suitable, with extensive variation in the parameters being possible. That being said, when these hydrotreaters (also called hydrocracking units) are operated under high severity conditions, the cost of operating these units may be costly. Without being limited by theory, the present multi-stage solvent deasphalting process enables the hydrotreaters to run at lesser severity conditions which consequently are less costly. In one or more embodiments, the temperature may be from 300 to 450° C., or from 340 to 400° C., whereas the pressure may vary from 20 to 200 kg/cm$^2$, or from 70 to 160 kg/cm$^2$. The LHSV may be from 0.1 to 2 h$^{-1}$, or from 0.25 to 0.75 h$^{-1}$, and the ratio of hydrogen/HQDAO may be from 100 to 5000 standard liters per liter, or 100 to 1000 standard liters per liter. Moreover, the parameters may be varied based on the type of high grade coke desired. For example, if needle coke is the desired product, the first hydrotreater 180 may need to run at higher temperatures or pressures, because needle coke has higher purity requirements than anode coke.

For example and not by way of limitation, the first hydrotreater 180 and the second hydrotreater 190, which is described in the following paragraphs, may include fixed bed reactors, ebullated-bed reactors, moving bed reactors, slurry bed reactors, or combinations thereof. In a fixed bed reactor, catalyst particles are stationary and do not move with respect to a fixed reference frame. Multiple fixed-bed reactors connected in series can be used to achieve a relatively high conversion of heavy feedstocks boiling at a cut point in the range of 300 to 500° C. An ebullated-bed reactor includes concurrently flowing streams of liquids or slurries of liquids, solids and gas, through a vertically oriented cylindrical vessel containing catalyst. The catalyst is placed in motion in the liquid and has a gross volume dispersed through the liquid medium that is greater than the volume of the mass when stationary. In an ebullated-bed reactor, the catalyst is in an expanded bed, thereby countering plugging potential problems associated with fixed-bed reactors. The fluidized nature of the catalyst in an ebullated-bed reactor also allows for on-line catalyst replacement of a small portion of the bed. This results in a high net bed activity which does not vary with time. Moving-bed reactors combine certain advantages of fixed-bed operations and the relatively easy catalyst replacement of ebullated-bed technology.

Catalysts employed in the first hydrotreater 180 and the second hydrotreater 190 may include components capable of facilitating the desired removal and conversion of contaminants in the HQDAO fraction 122. These catalysts may include supported active metal catalysts, where the active metals may include cobalt, nickel, tungsten, molybdenum or combinations thereof. The support material may be selected from the group consisting of alumina, silica-alumina, silica, and zeolites.

Referring to the embodiment of FIG. 4, the second hydrotreater 190 may remove sulfur, metals, and nitrogen from the LQDAO fraction 132 upstream of the delayed coker 140. While the operating parameters for the second hydrotreater 190 may have similar ranges to the operating parameters of the first hydrotreater 180 described previously, it is contemplated that second hydrotreater 190 may operate at a different severity than the first hydrotreater 180. For example, as the second hydrotreater 190 is purifying a less pure stream, the LQDAO fraction 132, than the first hydrotreater 180, the pressure or temperature may need to be adjusted to higher levels within the disclosed temperature and pressure ranges to account for the increased impurity level of the LQDAO fraction 132.

In the embodiment of FIG. 4, the second hydrotreater 190, which receives at least one hydrogen feed 192, may purify the LQDAO fraction 132 to produce a hydrotreated LQDAO fraction 194, which may undergo delayed coking to produce green coke 141 suitable for calcination into high grade coke 161.

EXAMPLES

One or more of the previously described features will be further illustrated in the following example simulations. Table 2 lists the definitions of the stream abbreviations in Tables 3-18.

TABLE 2

| Stream Abbreviations | Stream Definition |
|---|---|
| C$_3$-HQDAO | High quality deasphalted oil derived from propane solvent deasphalting |
| C$_3$-Asphalt | Asphalt derived from propane solvent deasphalting |
| C$_5$-LQDAO | Low quality deasphalted oil derived from pentane solvent deasphalting |
| C$_5$-Asphalt | Asphalt derived from pentane solvent deasphalting |
| MCR | Micro-Carbon residue |
| Desulf. HQDAO | High quality deasphalted oil desulfurized in an adsorption column. |
| Hted HQDAO | Hydrotreated high quality deasphalted oil |
| Hted LQDAO | Hydrotreated low quality deasphalted oil |

Example 1

Referring to FIG. 1, the Example 1 simulation was performed using residual oil derived from heavy crude oil with properties defined in Table 4. The feed of the residual oil 102 in Example 1 and all subsequent examples was 1000 kg, and the feed of the first paraffinic solvent 104 in Example 1 and all subsequent examples was 7000 kg, thereby achieving a solvent to oil ratio of 7. The operating parameters for the first solvent deasphalting unit 120, the second solvent deasphalting unit 130, and the delayed coker 140 are provided in Table 3, and the material balance properties for the streams are provided in Table 4. As shown, the HQDAO fraction 122 and the LQDAO fraction 132 are processed separately in the delayed coker 140. As shown, neither the HQDAO fraction 122 nor the LQDAO fraction 132 can produce high quality coke. All of the coke produced is fuel coke, because residual oil derived from heavy crude oil is more challenging to purify to high quality coke specifications.

TABLE 3

| | Operating Conditions | | |
|---|---|---|---|
| Operating Conditions | First Solvent Deasphalting Unit (120) | Second Solvent Deasphalting Unit (130) | Delayed Coker (140) |
| Temperature (° C.) | 70 | 170 | 490 |
| Pressure (Kg/cm$^2$) | 40 | 30 | 3 |
| Solvent Feed (kg) | 7000 kg Propane | 3850 kg Pentane | NA |
| Solvent/Oil Ratio | 7 | 7 | NA |

TABLE 4

Material Balance for HQDAO Processing

| | Stream# | | | | | | |
|---|---|---|---|---|---|---|---|
| | 102 | 122 | 124 | 132 | 134 | 142 | 141 |
| Stream Name | Residual Oil | $C_3$-HQDAO | C3-Asphalt | $C_5$-LQDAO | $C_5$-Asphalt | Distillates + Gas | Fuel Grade Coke |
| Feed/Product Rate (Kg) | 1000.0 | 450.0 | 550.0 | 407.0 | 143.0 | 437.8 (413.9 + 23.8) | 12.2 |
| Density (Kg/L) | 1.003 | 0.933 | 1.060 | 1.019 | 1.181 | | |
| API Gr. (°) | 9.6 | 20.2 | 2.0 | 7.4 | −11.7 | | |
| Sulfur (wt %) | 4.05 | 2.55 | 5.28 | 4.86 | 6.51 | | 3.83 |
| Nitrogen (Ppmw) | 2900 | 1200 | 4291 | 3298 | 7200 | | |
| MCR (wt %) | 16.4 | 1.7 | 28.4 | 14.7 | 68.6 | | |
| Nickel (Ppmw) | 19 | 1 | 34 | 14 | 93 | | 37 |
| Vanadium (Ppmw) | 61 | 1 | 110 | 32 | 337 | | 51 |

Example 2

Referring again to FIG. 1, the Example 2 simulation was performed using residual oil derived from light crude oil. The operating parameters for the first solvent deasphalting unit 120, the second solvent deasphalting unit 130, and the delayed coker 140 are provided in Table 5. The properties of the residual oil are provided in Table 6, and the material balance properties for the simulation streams are provided in Tables 6 and 7. As shown in the data of Table 6, the HQDAO fraction 122 is processed separately in the delayed coker 140. Table 7 shows the combined yield of the HQDAO fraction 122 and the LQDAO fraction 132 after being processed in the delayed coker 140. In contrast to Example 1, the HQDAO fraction 122 yielded high quality anode coke, while the LQDAO fraction 132 produced fuel grade coke. Without being limited to theory, the residual oil derived from light crude oil in Example 2 is easier to purify in the multi-stage solvent deasphalting depicted in FIG. 1 than the residual oil derived from heavy crude oil of Example 1.

TABLE 5

Operating Conditions

| Operating Conditions | First Solvent Deasphalting Unit (120) | Second Solvent Deasphalting Unit (130) | Delayed Coker (140) |
|---|---|---|---|
| Temperature (° C.) | 70 | 170 | 490 |
| Pressure (Kg/cm$^2$) | 40 | 30 | 3 |
| Solvent Feed (kg) | 7000 kg Propane | 3,220 kg Pentane | NA |
| Solvent/Oil Ratio | 7 | 7 | NA |

TABLE 6

Material Balance for HQDAO Processing

| | Stream# | | | | | | |
|---|---|---|---|---|---|---|---|
| | 102 | 122 | 124 | 132 | 134 | 142 | 161 |
| Stream Name | Residual Oil | $C_3$-HQDAO | C3-Asphalt | $C_5$-LQDAO | $C_5$-Asphalt | Distillates + Gas | Anode Grade Coke |
| Feed/Product Rate (Kg) | 1,000.0 | 540.0 | 460.0 | 391.0 | 69.0 | 527.5 (496.2 + 31.3) | 12.5 |
| Density (Kg/L) | 1.0 | 0.9 | 1.1 | 1.0 | 1.1 | | |
| API Gravity (°) | 12.6 | 21.6 | 3.3 | 5.3 | −7.5 | | |
| Sulfur (wt %) | 3.0 | 1.8 | 4.5 | 4.3 | 5.4 | | 2.7 |
| Nitrogen (Ppmw) | 3,200.0 | 800.0 | 6,017.4 | 2,708.0 | 24,457.0 | | 0.0 |
| MCR (wt %) | 12.9 | 2.0 | 25.7 | 18.7 | 64.7 | | |
| Nickel (Ppmw) | 17.0 | 1.0 | 35.8 | 18.0 | 137.0 | | 29.6 |
| Vanadium (Ppmw) | 26.0 | 1.0 | 55.3 | 20.0 | 252.0 | | 32.9 |

TABLE 7

Material Balance for HQDAO and LQDAO processing

| | Stream# | | | | | | |
|---|---|---|---|---|---|---|---|
| | 102 | 122 | 124 | 132 | 134 | 142 | 141 |
| Stream Name | Residual Oil | $C_3$-HQDAO | $C_3$-Asphalt | $C_5$-LQDAO | $C_5$-Asphalt | Distillates + Gas | Fuel Grade Coke |
| Feed/Product Rate (Kg) | 1,000.0 | 540.0 | 460.0 | 391.0 | 69.0 | 891.2 (871.6 + 19.6) | 39.8 |
| Density (Kg/L) | 1.0 | 0.9 | 1.1 | 1.0 | 1.1 | | |
| API Gr. (°) | 12.6 | 21.6 | 3.3 | 5.3 | −7.5 | | |
| Sulfur (wt %) | 3.0 | 1.8 | 4.5 | 4.3 | 5.4 | | 4.3 |
| Nitrogen (Ppmw) | 3,200.0 | 800.0 | 6,017.4 | 2,708.0 | 24,457.0 | | |
| MCR (wt %) | 12.9 | 2.0 | 25.7 | 18.7 | 64.7 | | |
| Nickel (Ppmw) | 17.0 | 1.0 | 35.8 | 18.0 | 137.0 | | 53.5 |
| Vanadium (Ppmw) | 26.0 | 1.0 | 55.3 | 20.0 | 252.0 | | 59.4 |

Example 3

Referring again to FIG. 1, the Example 3 simulation was performed using residual oil derived from light crude oil (65% by volume) and heavy crude oil (35% by volume) with properties defined in Table 9. The operating parameters for the first solvent deasphalting unit 120, the second solvent deasphalting unit 130, and the delayed coker 140 are provided in Table 9, and the material balance properties for the streams are provided in Table 9. As shown in the date of Table 9, the HQDAO fraction 122 and the LQDAO fraction 132 are combined and processed together in the delayed coker 140 to produce anode coke 161.

TABLE 8

| Operating Conditions | | | |
|---|---|---|---|
| Operating Conditions | First Solvent Deasphalting Unit (120) | Second Solvent Deasphalting Unit (130) | Delayed Coker (140) |
| Temperature (° C.) | 70 | 170 | 490 |
| Pressure (Kg/cm$^2$) | 40 | 30 | 3 |
| Solvent Feed (kg) | 7000 kg Propane | 3,220 kg Pentane | NA |
| Solvent/Oil Ratio | 7 | 7 | NA |

TABLE 9

Material Balance for HQDAO and LQDAO processing

| | Stream# | | | | | | |
|---|---|---|---|---|---|---|---|
| | 102 | 122 | 124 | 132 | 134 | 142 | 161 |
| Stream Name | Residual Oil | $C_3$-HQDAO | $C_3$-Asphalt | $C_5$-LQDAO | $C_5$-Asphalt | Distillates + Gas | Anode Grade Coke |
| Feed/Product Rate (Kg) | 1,000.0 | 540.0 | 460.0 | 391.0 | 69.0 | 899.9 | 31.1 |
| Density (Kg/L) | 1.0 | 0.9 | 1.1 | 1.0 | 1.1 | | |
| API Gravity (°) | 12.6 | 21.6 | 3.3 | 5.3 | −7.5 | | |
| Sulfur (wt %) | 2.5 | 1.5 | 3.4 | 3.2 | 4.2 | | 3.3 |
| Nitrogen (Ppmw) | 2,135.0 | 700.0 | 3,607.9 | 2,102.1 | 11,080.0 | | |
| MCR (wt %) | 10.3 | 1.3 | 18.9 | 11.7 | 46.7 | | |
| Nickel (Ppmw) | 12.6 | 0.7 | 24.3 | 11.2 | 80.5 | | 43.0 |
| Vanadium (Ppmw) | 30.5 | 0.8 | 57.8 | 18.2 | 206.2 | | 69.9 |

Example 4

Referring to FIG. 2, the Example 4 simulation was performed using residual oil derived from heavy crude oil with properties defined in Table 11. The operating parameters for the first solvent deasphalting unit 120, the second solvent deasphalting unit 130, the adsorption column 170, and the delayed coker 140 are provided in Table 10, and the material balance properties for the streams are provided in Tables 11 and 12. The adsorption column 170 included attapulgus clay having a surface area of 108 square meters per gram ($m^2/g$) and a pore volume of 0.392 cubic centimeters per gram ($cm^3/g$). As shown in the data of Tables 11 and 12, the HQDAO fraction 122 and the LQDAO fraction 132 are processed separately in the delayed coker 140. The HQDAO fraction 122 yielded high quality anode coke, while the LQDAO fraction 132 produced fuel grade coke. In comparison to Example 1, the inclusion of the adsorption column 170 provided additional purification to the HQDAO fraction 122 to eventually yield anode coke 161, whereas the Example 1 simulation did not yield anode coke with the same residual oil derived from heavy crude oil.

TABLE 10

Operating Conditions

| Operating Conditions | First Solvent Deasphalting Unit (120) | Second Solvent Deasphalting Unit (130) | Adsorption Column (170) | Delayed Coker (140) |
|---|---|---|---|---|
| Temperature (° C.) | 70 | 170 | 80 | 490 |
| Pressure ($Kg/cm^2$) | 40 | 30 | 3 | 3 |
| LHSV ($h^{-1}$) | NA | NA | 1 | NA |
| Solvent Feed (kg) | 7,000 kg Propane | 3,850 kg Pentane | NA | NA |
| Solvent/Oil Ratio | 7 | 7 | NA | NA |

TABLE 11

Material Balance for HQDAO processing

| | Stream# | | | | | | | |
|---|---|---|---|---|---|---|---|---|
| | 102 | 122 | 124 | 132 | 134 | 172 | 142 | 161 |
| Stream Name | Residual Oil | $C_3$-HQDAO | $C_3$-Asphalt | $C_5$-LQDAO | $C_5$-Asphalt | Desulf. HQDAO | Distillates + Gas | Anode Grade Coke |
| Feed/Product Rate (Kg) | 1000.0 | 450.0 | 550.0 | 407.0 | 143.0 | 360.0 | 355.1 | 4.9 |
| Density (Kg/L) | 1.003 | 0.933 | 1.060 | 1.019 | 1.181 | 0.905 | | |
| API Gravity (°) | 9.6 | 20.2 | 2.0 | 7.4 | −11.7 | | | |
| Sulfur (wt %) | 4.1 | 2.6 | 5.3 | 4.9 | 6.5 | 1.8 | | 2.7 |
| Nitrogen (Ppmw) | 2900 | 1200 | 4291 | 3298 | 7200 | 240 | | |
| MCR (wt %) | 16.4 | 1.7 | 28.4 | 14.7 | 68.6 | 0.9 | | |
| Nickel (Ppmw) | 19 | 1 | 34 | 14 | 93 | 0 | | 7 |
| Vanadium (Ppmw) | 61 | 1 | 110 | 32 | 337 | 0 | | 10 |

TABLE 12

Material Balance for LQDAO processing

| | Stream# | | | | | | | |
|---|---|---|---|---|---|---|---|---|
| | 102 | 122 | 124 | 132 | 134 | 172 | 142 | 141 |
| Stream Name | Residual Oil | HQDAO | $C_3$-Asphalt | LQDAO | $C_5$-Asphalt | Desulf. HQDAO | Distillates | Fuel Grade Coke |
| Feed/Product Rate (Kg) | 1000.0 | 450.0 | 550.0 | 407.0 | 143.0 | 360.0 | 311.3 | 95.7 |
| Density (Kg/L) | 1.003 | 0.933 | 1.060 | 1.019 | 1.181 | 0.905 | | |
| API Gravity (°) | 9.6 | 20.2 | 2.0 | 7.4 | −11.7 | | | |
| Sulfur (wt %) | 4.1 | 2.6 | 5.3 | 4.9 | 6.5 | 1.8 | | 7.3 |

TABLE 12-continued

Material Balance for LQDAO processing

| | Stream# | | | | | | |
|---|---|---|---|---|---|---|---|
| | 102 | 122 | 124 | 132 | 134 | 172 | 142 | 141 |
| Nitrogen (Ppmw) | 2900 | 1200 | 4291 | 3298 | 7200 | 240 | | |
| MCR (wt %) | 16.4 | 1.7 | 28.4 | 14.7 | 68.6 | 0.9 | | |
| Nickel (Ppmw) | 19 | 1 | 34 | 14 | 93 | 0 | | 81 |
| Vanadium (Ppmw) | 61 | 1 | 110 | 32 | 337 | 0 | | 114 |

Example 5

Referring to FIG. 3, the Example 5 simulation was performed using residual oil derived from heavy crude oil with properties defined in Table 14. The operating parameters for the first solvent deasphalting unit 120, the second solvent deasphalting unit 130, the first hydrotreater 180, and the delayed coker 140 are provided in Table 13, and the material balance properties for the streams are provided in Tables 14 and 15. As shown in the data of Tables 14 and 15, the HQDAO fraction 122 and the LQDAO fraction 132 are processed separately in the delayed coker 140. The HQDAO fraction 122 yielded high quality anode coke, while the LQDAO fraction 132 produced fuel grade coke. In comparison to Example 1, the inclusion of the first hydrotreater 180 provided additional purification to the HQDAO fraction 122 to eventually yield anode coke 161, whereas the Example 1 simulation did not yield anode coke with the same residual oil derived from heavy crude oil.

TABLE 13

Operating Conditions

| Operating Conditions | First Solvent Deasphalting Unit (120) | Second Solvent Deasphalting Unit (130) | First Hydro- treater (180) | Delayed Coker (140) |
|---|---|---|---|---|
| Temperature (° C.) | 70 | 170 | 380 | 490 |
| Pressure (Kg/cm²) | 40 | 30 | 115 | 3 |
| LHSV (h⁻¹) | NA | NA | 0.435 | NA |
| H₂/Oil Ratio | NA | NA | 300 | NA |
| Solvent Feed (kg) | 7,000 kg Propane | 3,850 kg Pentane | NA | NA |
| Solvent/Oil Ratio | 7 | 7 | NA | NA |

TABLE 14

Material Balance for HQDAO processing

| | Stream# | | | | | | | | |
|---|---|---|---|---|---|---|---|---|---|
| | 102 | 122 | 124 | 132 | 134 | 182 | 184 | 142 | 161 |
| Stream Name | Residual Oil | C₃- HQDAO | C₃- Asphalt | C₅- LQDAO | C₅- Asphalt | H₂ | Hted HQDAO | Distillates + Gas | Anode Grade Coke |
| Feed/ Product Rate (Kg) | 1000.0 | 450.0 | 550.0 | 407.0 | 143.0 | 7.2 | 456.8 | 446.9 (404.2 + 42.7) | 9.9 |
| Density (Kg/L) | 1.003 | 0.933 | 1.060 | 1.019 | 1.181 | | | | |
| API Gravity (°) | 9.6 | 20.2 | 2.0 | 7.4 | −11.7 | | | | |
| Sulfur (wt %) | 4.1 | 2.6 | 5.3 | 4.9 | 6.5 | | 1.4 | | 3.4 |
| Nitrogen (Ppmw) | 2900 | 1200 | 4291 | 3298 | 7200 | | 360 | | |
| MCR (wt %) | 16.4 | 1.7 | 28.4 | 14.7 | 68.6 | | 1.4 | | |
| Nickel (Ppmw) | 19 | 1 | 34 | 14 | 93 | | | | 38 |
| Vanadium (Ppmw) | 61 | 1 | 110 | 32 | 337 | | | | 54 |

TABLE 15

Material Balance for LQDAO processing

| | Stream# | | | | | | |
|---|---|---|---|---|---|---|---|
| | 102 | 122 | 124 | 132 | 134 | 142 | 141 |
| Stream Name | Residual Oil | $C_3$-HQDAO | $C_3$-Asphalt | $C_5$-LQDAO | $C_5$-Asphalt | Distillates + Gas | Fuel Grade Coke |
| Feed/Product Rate (Kg) | 1000.0 | 450.0 | 550.0 | 407.0 | 143.0 | 311.3 | 95.7 |
| Density (Kg/L) | 1.003 | 0.933 | 1.060 | 1.019 | 1.181 | | |
| API Gravity (°) | 9.6 | 20.2 | 2.0 | 7.4 | −11.7 | | |
| Sulfur (wt %) | 4.1 | 2.6 | 5.3 | 4.9 | 6.5 | | 7.3 |
| Nitrogen (Ppmw) | 2900 | 1200 | 4291 | 3298 | 7200 | | |
| MCR (wt %) | 16.4 | 1.7 | 28.4 | 14.7 | 68.6 | | |
| Nickel (Ppmw) | 19 | 1 | 34 | 14 | 93 | | 81 |
| Vanadium (Ppmw) | 61 | 1 | 110 | 32 | 337 | | 114 |

Example 6

Referring to FIG. 4, the Example 6 simulation was performed using residual oil derived from heavy crude oil with properties defined in Table 17. The operating parameters for the first solvent deasphalting unit 120, the second solvent deasphalting unit 130, the first hydrotreater 180, the second hydrotreater 190, and the delayed coker 140 are provided in Table 16, and the material balance properties for the streams are provided in Table 17. As shown in Table 17, the HQDAO fraction 122 and the LQDAO fraction 132 are combined and processed together in the delayed coker 140. Both the HQDAO fraction 122 and the LQDAO fraction 132 yielded high quality anode coke.

TABLE 16

Operating Conditions

| Operating Conditions | First Solvent Deasphalting Unit (120) | Second Solvent Deasphalting Unit (130) | First Hydro-treater (180) | Second Hydro-treater (190) | Delayed Coker (140) |
|---|---|---|---|---|---|
| Temperature (° C.) | 70 | 170 | 380 | 380 | 490 |
| Pressure (Kg/cm$^2$) | 40 | 30 | 115 | 150 | 3 |
| LHSV (h$^{-1}$) | NA | NA | 0.435 | 0.435 | NA |
| H$_2$/Oil Ratio | NA | NA | 300 | 300 | NA |
| Solvent Feed (kg) | 7,000 kg Propane | 3,850 kg Pentane | NA | NA | NA |
| Solvent/Oil Ratio | 7 | 7 | NA | NA | NA |

TABLE 17

Material Balance for HQDAO processing

| | Stream# | | | | | | | | | | |
|---|---|---|---|---|---|---|---|---|---|---|---|
| | 102 | 122 | 124 | 132 | 134 | 182 | 184 | 142 | 161 | 192 | 194 |
| Stream Name | Residual Oil | $C_3$-HQDAO | $C_3$-Asphalt | $C_5$-LQDAO | $C_5$-Asphalt | $H_2$ | Hted HQDAO | Distillates + Gas | Anode Grade Coke | $H_2$ | Hted LQDAO | Comb. Hted DAO |
| Feed/Product Rate (Kg) | 1000 | 450.0 | 550.0 | 407.0 | 143.0 | 7.2 | 456.8 | 784.6 (708.5 + 76.1) | 88.9 | 7.4 | 416.7 | 873.5 |
| Density (Kg/L) | 1.003 | 0.933 | 1.060 | 1.019 | 1.181 | | | | | | | |
| API Gravity (°) | 9.6 | 20.2 | 2.0 | 7.4 | −11.7 | | | | | | | |
| Sulfur (wt %) | 4.1 | 2.6 | 5.3 | 4.9 | 6.5 | | 1.3 | | 2.7 | | 2.4 | 1.8 |
| Nitrogen (Ppmw) | 2900 | 1200 | 4291 | 3298 | 7200 | | 360 | | | | 989 | 660 |
| MCR (wt %) | 16.4 | 1.7 | 28.4 | 14.7 | 68.6 | | 1.4 | | | | 11.8 | 6.3 |
| Nickel (Ppmw) | 19 | 1 | 34 | 14 | 93 | | 1 | | 72 | | 11 | 6 |
| Vanadium (Ppmw) | 61 | 1 | 110 | 32 | 337 | | 1 | | 101 | | 24 | 12 |

The following table further elaborates on the value for the HtedHQDAO and HtedLQDAO streams of Table 17.

TABLE 18

| Yield | HtedHQDAO | HtedLQDAO | Total |
|---|---|---|---|
| Anode Grade Coke (161) | 10.2 | 78.7 | 88.9 |
| Gas in Stream (142) | 36.6 | 39.6 | 76.1 |
| Distillate in Stream (142) | 410.0 | 298.4 | 708.5 |
| Total | 456.8 | 416.7 | 873.5 |

It should now be understood that the various aspects of the process for producing green coke and fuel grade coke from residual oil and the system for producing the same are described and such aspects may be utilized in conjunction with various other aspects.

In a first aspect, the disclosure provides a process for producing green coke and fuel grade coke from residual oil. The process comprises introducing the residual oil and a first paraffinic solvent having a carbon number $C_n$ to a first solvent deasphalting unit to produce a high quality deasphalted oil (HQDAO) fraction and a first asphalt fraction. The process further comprises passing the HQDAO fraction to a delayed coker to produce green coke. Further, the process includes passing at least a portion of the first asphalt fraction and a second paraffinic solvent carbon number of $C_{n+1}$ to a second solvent deasphalting unit to produce a low quality deasphalted oil (LQDAO) fraction and a second asphalt fraction. Finally, the process comprises passing the LQDAO fraction to the delayed coker to produce the fuel grade coke.

In a second aspect, the disclosure provides the process of the first aspect, in which the HQDAO fraction is passed to the delayed coker and produces green coke during a first period, and the LDQDAO fraction is passed to the delayed coker and produce fuel grade coke during a second period. Further, the first period occurs before the second period, or the first period occurs after the second period.

In a third aspect, the disclosure provides the process of the first aspect, in which the HQDAO fraction and the LQDAO fraction are passed to the delayed coker simultaneously.

In a fourth aspect, the disclosure provides the process of any of the first through third aspects, in which the process further comprises calcining the green coke to produce anode coke, needle coke, or combinations thereof.

In a fifth aspect, the disclosure provides the process of any of the first through fourth aspects, in which the process further comprises subjecting the second asphalt fraction to further asphalt utilization and conversion steps.

In a sixth aspect, the disclosure provides the process of any of the first through fifth aspects, in which the process further comprises subjecting the first asphalt fraction to further asphalt utilization and conversion steps.

In a seventh aspect, the disclosure provides the process of any of the first through sixth aspects, in which the delayed coker comprises dual delayed coking drums.

In an eighth aspect, the disclosure provides the process of any of the first through seventh aspects, in which the process further comprises passing the HQDAO fraction to an adsorption column prior to passing the HQDAO fraction to the delayed coker.

In a ninth aspect, the disclosure provides the process of the eighth aspect, in which the adsorption column is a packed column.

In a tenth aspect, the disclosure provides the process of the eighth or ninth aspects, in which the adsorption column includes two columns.

In an eleventh aspect, the disclosure provides the process of any of the first through tenth aspects, in which the process further comprises passing the HQDAO fraction to a first hydrotreater prior to passing the HQDAO fraction to the delayed coker.

In a twelfth aspect, the disclosure provides the process of any of the first through eleventh aspects, in which the process further comprises passing the LQDAO fraction to a second hydrotreater prior to passing the LQDAO fraction to the delayed coker.

In a thirteenth aspect, the disclosure provides the process of any of the first through twelfth aspects, in which the first paraffinic solvent comprises propane and the second paraffinic solvent comprising pentane.

In a fourteenth aspect, the disclosure provides the process of any of the first through thirteenth aspects, in which the ratio of the first paraffinic solvent to the residual oil is from 2 to 20.

In a fifteenth aspect, the disclosure provides the process of any of the first through fourteenth aspects, in which the ratio of the first paraffinic solvent to the residual oil is from 5 to 10.

In a sixteenth aspect, the disclosure provides a system for producing green coke and fuel grade coke from residual oil. The system comprises a first solvent deasphalting unit configured to produce a high quality deasphalted oil (HQDAO) fraction and a first asphalt fraction from the residual oil and a first paraffinic solvent having a carbon number G. The system further comprises a second solvent deasphalting unit downstream of the first solvent deasphalting unit. The second solvent deasphalting unit is configured to produce a low quality deasphalted oil (LQDAO) fraction and a second asphalt fraction from the first asphalt fraction and a second paraffinic solvent having carbon number of $C_{n+1}$. The system also comprises a delayed coker in fluid communication with the first solvent deasphalting unit and the second solvent deasphalting unit. The delayed coker is configured to produce green coke from the HQDAO fraction and is configured to produce fuel coke from the LQDAO fraction.

In a seventeenth aspect, the disclosure provides the system of the sixteenth aspect, in which the system further comprises an adsorption column disposed downstream of the first solvent deasphalting unit and upstream of the delayed coker.

In an eighteenth aspect, the disclosure provides the system of the seventeenth aspect, in which the adsorption column comprises at least one packed column.

In a nineteenth aspect, the disclosure provides the system of any of the sixteenth through eighteenth aspects, in which the system further comprises a first hydrotreater disposed downstream of the first solvent deasphalting unit and upstream of the delayed coker.

In a twentieth aspect, the disclosure provides the system of any of the sixteenth through nineteenth aspects, in which the system further comprises a second hydrotreater disposed downstream of the second solvent deasphalting unit and upstream of the delayed coker.

It should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

Throughout this disclosure ranges are provided. It is envisioned that each discrete value encompassed by the ranges are also included. Additionally, the ranges which may be formed by each discrete value encompassed by the explicitly disclosed ranges are equally envisioned.

What is claimed is:

1. A process for producing green coke and fuel grade coke from residual oil comprising:
  introducing the residual oil and a first paraffinic solvent having a carbon number $C_n$ to a first solvent deasphalting unit to produce a high quality deasphalted oil (HQDAO) fraction and a first asphalt fraction;
  passing the HQDAO fraction to a delayed coker to produce green coke;
  passing at least a portion of the first asphalt fraction and a second paraffinic solvent carbon number of $C_{n+1}$ to a second solvent deasphalting unit to produce a low quality deasphalted oil (LQDAO) fraction and a second asphalt fraction; and
  passing the LQDAO fraction to the delayed coker to produce the fuel grade coke.

2. The process of claim 1, wherein the HQDAO fraction is passed to the delayed coker and produces green coke during a first period, and the LDQDAO fraction is passed to the delayed coker and produce fuel grade coke during a second period, wherein the first period occurs before the second period, or the first period occurs after the second period.

3. The process of claim 1, wherein the HQDAO fraction and the LQDAO fraction are passed to the delayed coker simultaneously.

4. The process of claim 1, further comprising calcining the green coke to produce anode coke, needle coke, or combinations thereof.

5. The process of claim 1, further comprising subjecting the second asphalt fraction to further asphalt utilization and conversion steps.

6. The process of claim 1, further comprising subjecting the first asphalt fraction to further asphalt utilization and conversion steps.

7. The process of claim 1, where the delayed coker comprises dual delayed coking drums.

8. The process of claim 1, further comprising passing the HQDAO fraction to an adsorption column prior to passing the HQDAO fraction to the delayed coker.

9. The process of claim 8, where the adsorption column is a packed column.

10. The process of claim 8, where the adsorption column includes two columns.

11. The process of claim 1, further comprising passing the HQDAO fraction to a first hydrotreater prior to passing the HQDAO fraction to the delayed coker.

12. The process of claim 1, further comprising passing the LQDAO fraction to a second hydrotreater prior to passing the LQDAO fraction to the delayed coker.

13. The process of claim 1, where the first paraffinic solvent comprises propane and the second paraffinic solvent comprising pentane.

14. The process of claim 1, where the ratio of the first paraffinic solvent to the residual oil is from 2 to 20.

15. The process of claim 1, where the ratio of the first paraffinic solvent to the residual oil is from 5 to 10.

* * * * *

UNITED STATES PATENT AND TRADEMARK OFFICE
CERTIFICATE OF CORRECTION

PATENT NO. : 10,233,394 B2
APPLICATION NO. : 15/491534
DATED : March 19, 2019
INVENTOR(S) : Omer Refa Koseoglu Page 1 of 1

It is certified that error appears in the above-identified patent and that said Letters Patent is hereby corrected as shown below:

In the Claims

Column 21, Line 27, Claim 2:
"during a first period, and the LDQDAO fraction is passed to"
Should read:
--during a first period, and the LQDAO fraction is passed to--.

Signed and Sealed this
Twenty-fifth Day of June, 2019

Andrei Iancu
*Director of the United States Patent and Trademark Office*